No. 675,363. Patented May 28, 1901.
C. F. BERGMANN.
ENGINE.
(Application filed July 2, 1900.)
(No Model.) 2 Sheets—Sheet 1.

WITNESSES: INVENTOR
Carl F. Bergmann
BY
Lifford & Bull
his ATTORNEYS.

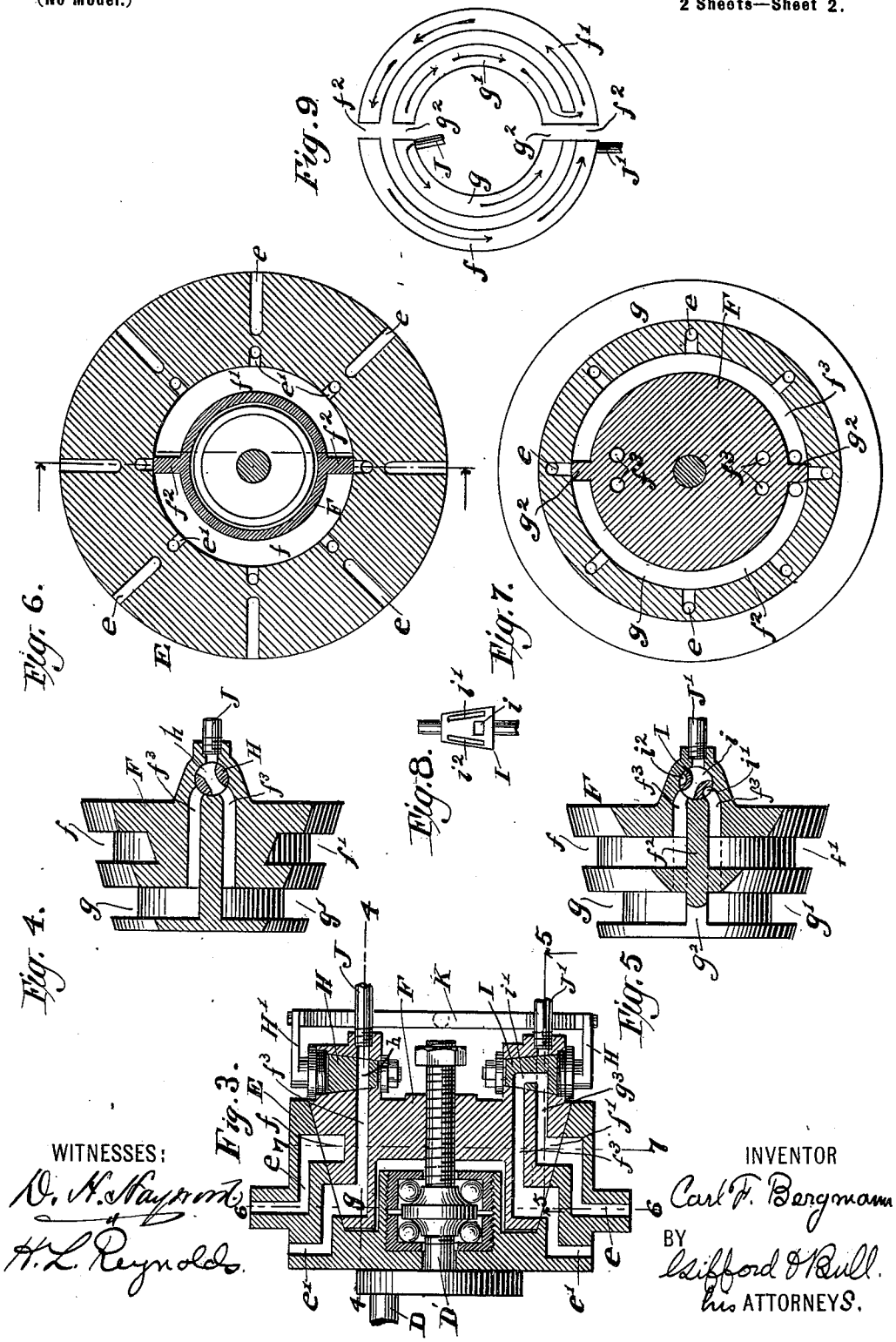

UNITED STATES PATENT OFFICE.

CARL F. BERGMANN, OF JERSEY CITY, NEW JERSEY, ASSIGNOR TO THE FOYE HUB MOTOR AND AUTOMOBILE COMPANY, OF NEW JERSEY.

ENGINE.

SPECIFICATION forming part of Letters Patent No. 675,363, dated May 28, 1901.

Application filed July 2, 1900. Serial No. 22,270. (No model.)

*To all whom it may concern:*

Be it known that I, CARL F. BERGMANN, a citizen of the United States, and a resident of Jersey City, in the county of Hudson and State of New Jersey, have invented a new and Improved Engine, of which the following is a full, clear, and exact description.

My invention relates to an improvement in engines designed especially for use upon automobiles, but capable of use in generating power for any purpose.

My invention comprises certain novel features which will be hereinafter described, and particularly pointed out in the claims.

Reference is to be had to the accompanying drawings, forming a part of this specification, in which similar characters of reference indicate corresponding parts in all the figures.

Figure 2:
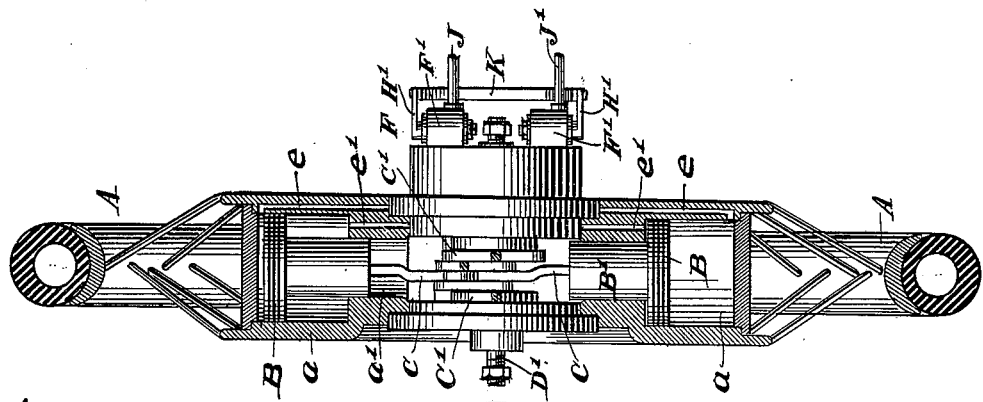
Figure 1:
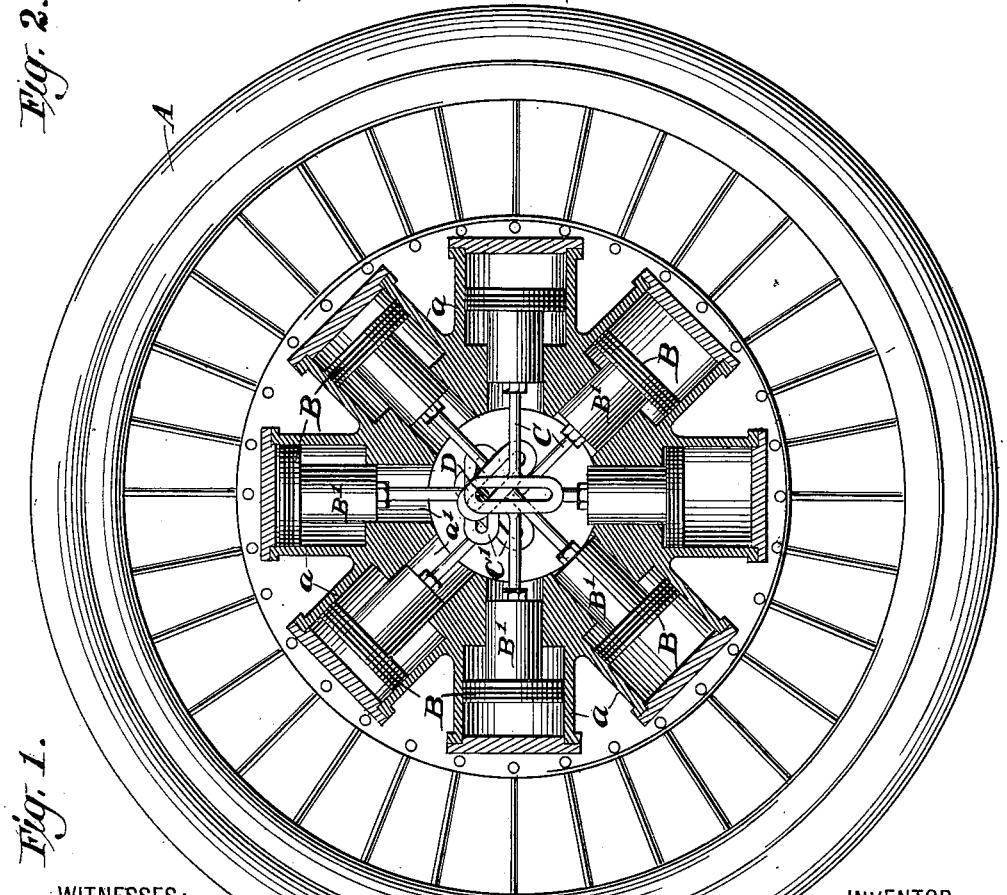

Figure 1 is a side elevation of a wheel having my engine incorporated therewith, the engine-cylinders being shown in section. Fig. 2 is a transverse section of the same wheel. Fig. 3 is an axial section taken through the hub at one side of the wheel, showing the arrangement of the ports and valves. Fig. 4 is a section taken upon the line 4 4 of Fig. 3. Fig. 5 is a section taken upon the line 5 5 of Fig. 3. Fig. 6 is a section taken upon the line 6 6 of Fig. 3. Fig. 7 is a section taken upon the line 7 7 of Fig. 3. Fig. 8 is a detail elevation of the valve controlling the passage of steam from the high to the low pressure cylinders and the exhaust from the low-pressure cylinders, and Fig. 9 is a diagram illustrating the course of the steam through the engine.

The engine herein shown is of a type designed to be constructed within or secured to the wheel of a vehicle and acting upon a crank formed upon the axle of the vehicle, the engine-cylinders turning with the wheel. Although I have herein shown my engine only as adapted to use in connection with the wheel of a vehicle, it is evident that the engine might be used for stationary purposes, the wheel A then acting as a fly-wheel.

The engine herein shown is designed to operate as a compound engine, the cylinders $a$ and $a'$ being arranged in tandem pairs extending radially within the wheel. The number of such cylinders used will depend upon the requirements in each particular case, the number herein shown being eight. The smaller cylinders, $a'$, are placed inward or nearest the center of the wheel and the larger, $a$, outermost or farthest from the center of the wheel. The inner cylinder $a'$ acts simply as a guide for the smaller part B' of the piston. The piston-head B thus has unequal surfaces for the action of the steam on opposite sides, the inner side being in effect an annular piston, while the outer side is an ordinary piston of the full size of the cylinder $a$. The inner or annular side is acted upon by the steam under high pressure, and thus forms the high-pressure cylinder, while the outer side receives the exhaust from the inner or high-pressure side, and thus acts as the low-pressure cylinder. The pistons, which are directly opposite each other, are preferably connected by a common piston-rod C, and this rod is connected with the crank D, formed upon the wheel-axle D', in any suitable manner. The manner of connection herein shown is by means of transversely-extending yokes or links C'.

Suitable ports are formed within the walls of the cylinders and extend toward the hub upon one side, by means of which the steam may be conducted to and from the cylinders. These ports are shown at $e$ and $e'$ in Fig. 3, which is a section of the wheel-hub E and the stationary hub F, within which the valves are placed. The ports $e'$ lead to the high-pressure ends of the cylinders, and the ports $e$ lead to the low-pressure ends. These ports at their inner ends terminate in a conical circular recess, within which closely fits a stationary hub F, which is carried by the wheel-axle and which is provided with semicircular peripheral grooves $g\ g'$ and $f\ f'$. These peripheral grooves are separated by partitions or walls $g^2$ and $g^2$. The grooves $f\ f'$ are adapted to register with the ends of the ports $e$, and the grooves $g\ g'$ are adapted to register with the ports $e'$. These peripheral grooves are connected with steam-passages $f^3$ and $g^3$, extending to the outer end of the hub and controlled by valves H and I. Two steam-passages $f^3$ are provided upon one side of the hub and two similar passages upon the other side, as is clearly shown in Fig. 7. The passages $g^3$ are upon one side only of the hub and adjacent to the passages $f^3$ upon the same side of the hub. The valve H is an ordinary plug-valve and has a single passage $h$ through it and adapted to connect either one of the passages $f^3$ with the steam-supply pipe J. The valve I is a plug-valve, having a through-passage $i$, adapted to connect either one of the passages $g^3$ with the exhaust-pipe J', and in addition has two longitudinally-extending passages $i'$ and $i^2$, adapted to connect corresponding passages $g^3$ and $f^3$ to conduct the steam from the high-pressure to the low-pressure ends of the cylinders.

By examining Fig. 5 it will be seen that a slight turn of the valve I from the position shown in the figure will throw the longitudinal connecting-passage $i'$ out of connection with the passages $g^3$ and $f^3$ and throw the longitudinal passage $i^2$ into connection with the other passage $g^3$. This puts the engine in a condition for rotation in the opposite direction. By turning the valve H to a similar angle the steam is admitted to the opposite one of the passages $f^3$ and the engine placed in position for reverse rotation. The two valves H and I are provided with arms H', which are connected to a common operating device by means of a yoke K, so that they may both be turned at once. By turning these valves through a slight angle the engine may be reversed.

The course of the steam through the engine may be seen by reference to the diagram shown in Fig. 9. In this diagram the semicircular passages $f$ and $f'$, which are connected with the low-pressure cylinders, are shown outside, and the two semicircular grooves $g$ and $g'$, which are connected with the high-pressure ends of the cylinders, are shown inside. Steam enters through the supply-pipe J to one of the inner or high-pressure passages or grooves, as the groove $g'$. From this groove it passes into the various ports or steam-passages $e'$, leading to the high-pressure cylinder, the steam being connected with the high-pressure ends of the cylinders throughout the time that the ports are in communication with this groove. As soon as the port of any high-pressure cylinder passes the partition or wall $g^2$ at one end of the groove $g$ it is brought into communication with the corresponding groove $g'$ which is at the time acting as an exhaust-steam passage. From this groove it passes by means of one of the grooves $i'$ or $i^2$ into the outer or low-pressure steam passage $f'$, from which it passes into the ports $e$, which communicate with the low-pressure ends of the cylinders. After the port $e$ passes the partition $f^2$ it is in communication with the groove $f$ which at this time is acting as an exhaust-passage and then passes through the passage $i$ in the valve I into the exhaust-pipe J'. When the valves H and I are shifted to reverse the engine, the various passages $g$ $g'$ and $f$ $f'$ are reversed in function, those which were previously acting as supply-steam passages now acting as exhaust-steam passages.

Having thus fully described my invention, I claim as new and desire to secure by Letters Patent—

1. The combination with a cranked shaft, a wheel mounted to turn thereon and having substantially radial cylinders arranged in tandem pairs as high and low pressure, and ports leading from said cylinders to the wheel-hub, a hub member fixed to the shaft and having peripheral grooves arranged in pairs, each extending around less than half the circle, the pairs of grooves being adapted one to register with the ports leading to the high-pressure cylinders and the other with those leading to the low-pressure cylinders, supply and discharge ports leading from said grooves and reversing-valves controlling the flow through the ports in the fixed hub, substantially as described.

2. The combination with a crank-shaft, a wheel mounted to turn thereon and having substantially radial cylinders arranged in tandem pairs as high and low pressure cylinders, and ports leading from said cylinders to the wheel-hub, a hub member fixed to the shaft and having peripheral grooves arranged in pairs, each extending around less than half the circle, the pairs of grooves being adapted one to register with the ports leading to the high-pressure cylinders and the other with those leading to the low-pressure cylinders, supply and discharge ports leading from said grooves, a steam-supply and a steam-exhaust connection, a valve in the steam-supply connection adapted to be shifted to deliver to either supply-port, a valve connecting the high and low pressure grooves in the fixed hub and having a port for the passage from the exhaust-grooves, and by-pass ports adapted to connect corresponding high and low pressure grooves in the fixed hub, and means for shifting said valves to reverse the engine, substantially as described.

3. The combination with a crank-shaft, a wheel mounted to turn thereon and having substantially radial cylinders arranged in tandem pairs as high and low pressure, and ports leading from said cylinders to the wheel-hub, a fixed hub member having peripheral grooves arranged in pairs each extending around less than half the circle, the pairs of grooves being adapted one to register with the ports leading to the high-pressure cylinders and the other with those leading to the low-pressure cylinders, supply and discharge ports in the fixed hub leading from said grooves, a steam-supply and a steam-exhaust connection, two plug-valves, one in the steam-supply connection adapted to be shifted to deliver to either supply-port, and the other connecting the high and low pressure grooves in the fixed hub, and having a port for the passage from the exhaust-grooves and by-pass ports adapted to connect corresponding high and low pressure grooves in the fixed hub, levers connected with said valve, and a common operating connection with said levers, substantially as described.

In testimony whereof I have signed my name to this specification in the presence of the two subscribing witnesses.

CARL F. BERGMANN.

Witnesses:
  H. L. REYNOLDS,
  CHAS. J. RATHJEN.